United States Patent [19]
Bombich

[11] 3,803,724
[45] Apr. 16, 1974

[54] BY-PASS VALVE FOR A GAS DRYER

[75] Inventor: Norbert S. Bombich, Pittsburgh, Pa.

[73] Assignee: Ajax Magnethermic Corporation, Warren, Ohio

[22] Filed: Aug. 16, 1972

[21] Appl. No.: 281,031

[52] U.S. Cl. .............................. 34/80, 34/9, 34/95
[51] Int. Cl. ............................................ F26b 21/06
[58] Field of Search ....... 34/9, 80, 95; 415/53, 53 T

[56] References Cited
UNITED STATES PATENTS

| 2,563,042 | 8/1951 | Jaubert | 34/80 |
|---|---|---|---|
| 2,465,162 | 3/1949 | Lockwood | 34/80 X |
| 3,621,585 | 11/1971 | Robertson | 34/80 |
| 3,257,955 | 6/1966 | Worst | 415/53 T |

Primary Examiner—John J. Camby

[57] ABSTRACT

A by-pass valve for a gas drying system is mounted on a blower for flowing gas through the system. The by-pass valve comprises an inlet aligned with the inlet of the blower, an outlet aligned with the outlet of the blower, and a by-pass port connecting the inlet and the outlet of the valve. The cross-sectional area of the by-pass port is adjustable by movement of a restricting member into and out of the port. The gas pressure at the outlet of the blower and the gas flow rate leaving the blower can be varied by adjusting the position of the restricting member in the by-pass port to divert or prevent diversion of some of the gas at the outlet of the blower. The gas thus diverted from the gas drying system is recirculated through the blower to thereby minimize additional gas required at the blower inlet to meet the gas flow requirement of the system receiving the dried gas.

4 Claims, 4 Drawing Figures

3,803,724

BY-PASS VALVE FOR A GAS DRYER

BACKGROUND OF THE INVENTION

This invention relates to gas drying apparatus and, more particularly, to by-pass valve means for controlling the amount of gas flowing through the drying apparatus.

Apparatus for the drying and purifying of gas by the method of contacting it with an adsorbent material or desiccant, such as activated alumina, is well known. In systems of this type, the gas to be treated is passed for a period of time through a bed of adsorbent material until it becomes substantially saturated with moisture or other impurities. At this point, removal of moisture and impurities by the adsorbent bed is stopped and the bed is reactivated. A common type of gas drying apparatus is one in which there are two adsorbent beds or dual chambers containing adsorbent material. In such apparatus, while one bed is drying gas the other is being reactivated. The drying and reactivating periods of each bed are usually continuously alternated. Due to the resistance to gas flow through the adsorbent bed material and other apparatus used to purify the gas and reactivate each bed, a means is required for flowing the gas through the apparatus. This apparatus generally takes the form of either a blower or a compressor.

Where a blower is utilized, it is generally desirable for commercial reasons to have a single size and type of blower that will operate satisfactorily with various sizes and types of gas drying apparatus. In order to meet this requirement, the fan or blower used should have an output flow rate and pressure which may be controllably varied in accord with the requirements of the gas drying apparatus. However, the output pressure and flow rate of the most economical types of blowers cannot be varied except by changing the speed of the impellor. This usually requires a speed reduction system which, again, increases the overall cost of the gas drying apparatus.

SUMMARY OF THE INVENTION

It is a general object of the invention to provide an adsorbent material gas drying apparatus having an inexpensive and efficient means for selectively controlling the flow rate and pressure of the gas flowing through the apparatus.

A more specific object of the invention is to provide a simple valve means for a blower in a gas drying apparatus which can be readily adjusted to control the gas pressure and the rate of gas flow through the gas drying apparatus.

The objects of the invention are accomplished by providing, in a gas drying apparatus including at least one adsorbent chamber having alternating drying and reactivating periods and means for carrying the gas through the chamber and controlling the alternating drying and reactivating periods of the chamber, a blower for flowing gas through the gas drying apparatus and a by-pass valve connecting the inlet and outlet of the blower. The by-pass valve includes a port connected between the inlet and outlet of the blower and a means for adjusting the cross-sectional area of the port. A portion of the gas leaving the blower at its outlet passes through the port back to the inlet of the blower and is recirculated through the blower. The amount of gas being recirculated through the blower is determined by the adjustment in size of the port cross section. By thus adjusting the size of the by-pass port, the rate of flow and pressure of the gas exhausting from the gas drying apparatus may be easily controlled.

DESCRIPTION OF THE PREFERRED EMBODIMENT

Figure 1:
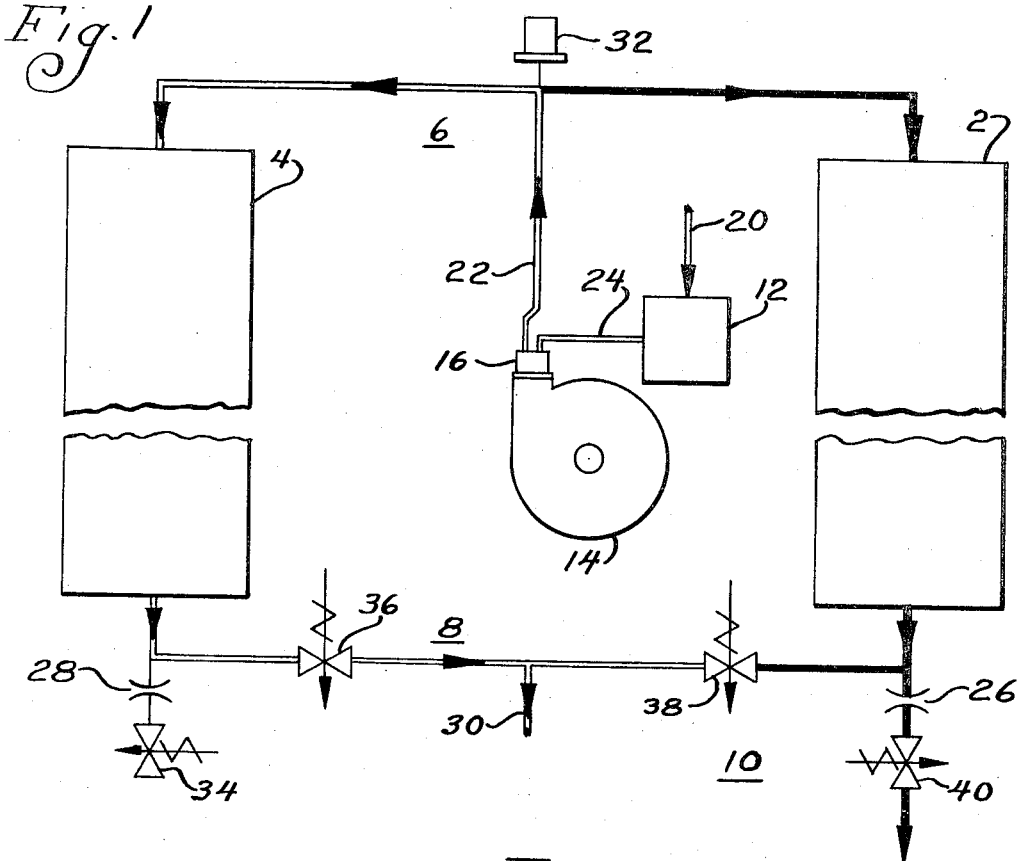
FIG. 1 schematically illustrates a typical gas drying apparatus in which the instant invention may be utilized.

Referring to FIG. 1 of the drawing, a gas drying apparatus is shown as having first and second adsorbent beds or chambers 2 and 4, a gas inlet passage or conduit means 6, a gas outlet passage or conduit means 8, and valve means 10.

The gas inlet passage means 6 includes a gas intake 20, conduit 22 and conduit 24. The gas outlet passage means 8 includes an orifice 26, an orifice 28 and gas outlet 30. The valve means 10 includes pressure relief valve 32 and solenoid operated two-way valves 34, 36, 38 and 40.

A gas filter 12 is connected to the gas inlet passage means 6 adjacent the gas intake 20 and a fan or blower 14 is connected to the gas inlet passage means 6 downstream of the filter 12. A gas by-pass valve 16 is connected to the conduit 22 and 24 of the gas inlet passage means 6.

Figure 2:
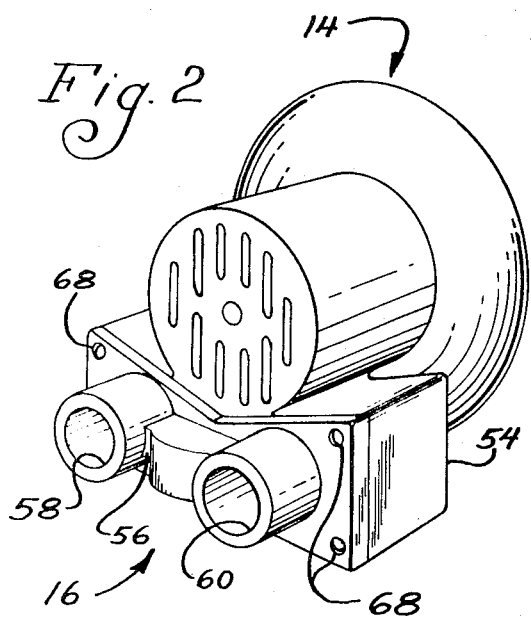
FIG. 2 is a perspective view of a blower and valve means according to the instant invention.
Figure 3:
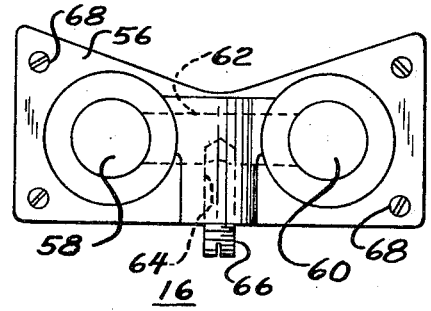
FIG. 3 is an elevational view of the valve means.
Figure 4:
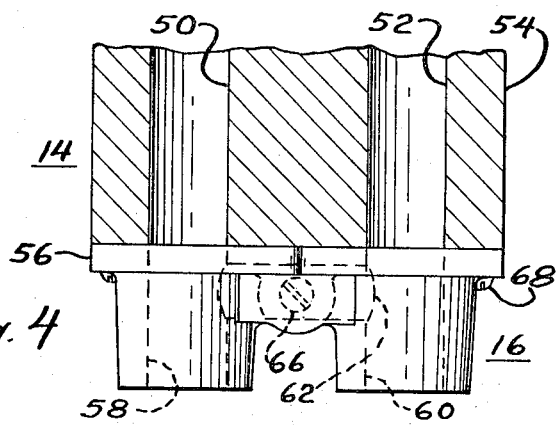
FIG. 4 is a plan view, partly in cross-section, of the valve means.

The blower 14 is of a constant speed type well known in the art and, as shown in FIGS. 2 – 4, has a gas intake 50, a gas outlet 52, and a frame 54. The by-pass valve 16 is mounted on the frame 54 of the blower 14 and includes a mounting plate 56, an inlet passage 58 aligned with the intake 50 of the blower and an outlet passage 60 aligned with the outlet 52 of the blower. A by-pass port 62 connects the inlet and outlet passages 58 and 60 of the valve 16 and thereby the intake and outlet 50 and 52 of the blower 14. The mounting plate 56 is held on the frame 54 by screws 68. A threaded opening 64 extends radially out of the by-pass port 62. A threaded blocking member of flow restrictor 66 is inserted into the opening 64 and is movable into and out of the port 62 to thereby provide a means of adjusting the cross-sectional area of the port 62.

During operation of the gas drying apparatus, gas flows through the gas intake 20, the gas filter 12, the conduit 24, and then through the inlet passage 58 of the by-pass valve 16 and through the gas intake 50 of the blower 14. The gas exhausts from the blower 14 through the gas outlet 52 of the blower and outlet passage 60 of the by-pass valve 16 to the first and second adsorbent chambers 2 and 4. The pressure of the gas intake 20 may be at atmospheric pressure. The gas pressure at the inlet passage 58 of the by-pass valve 16 and the gas intake 50 of the blower 14 will be lower than the pressure at the gas intake 20 due to the action of the blower. Also, neglecting the operation of the by-pass valve 16, the pressure at the gas outlet 52 of the blower 14 and at the outlet passage 60 of the valve 16 will be higher than the gas pressure at the intake 50 of the blower 16. If the gas flow rate and gas pressure at the outlet 52 of the blower 14 are not of the desired values, the by-pass port 62 can be utilized to trim or adjust the gas flow rate and pressure leaving the outlet passage 60 of the by-pass valve 16 to the adsorbent chambers 2 and 4. The flow restrictor 66 is merely adjusted to block the by-pass port 62 to the extent required to produce the desired flow rate and pressure of the gas leaving the outlet passage 60 of the by-pass valve 16. For example, neglecting the increase in pressure between the inlet and outlet of the blower for purposes of simplicity, if the maximum gas flow rate to the adsorbent chambers 2 and 4 is to be 8 cfm, but the blower 14 normally produces a flow rate of 10 cfm, the flow restrictor 66 can be adjusted so that 2 cfm of gas is diverted from flowing to the adsorbent chambers 2 and 4 and circulated back to the inlet passage 58 of the valve 15 and thus recirculated through the blower 14. As a result, the amount of new gas that must enter the blower in order to produce the 8 cfm at the outlet of the blower is only 6cfm.

Due to the resistance to gas flow caused by the apparatus downstream of the blower and by the system receiving the dry gas, the gas leaving the blower normally is at a higher pressure than the gas entering the blower. If this pressure is not at the level required to give the desired flow rate, the by-pass valve 60 can be adjusted to drop or raise pressure at the outlet 52 of the blower 14. In a gas drying apparatus in which the by-pass valve is incorporated, the gas flow and pressure at the gas outlet of the drying apparatus is required to be respectively 8 cfm and 7.5 inches of water. However, the blower incorporated in the drying apparatus produces a gas flow rate of the drying apparatus outlet of 8 cfm and a pressure of 22 inches of water. The flow restrictor 66 is accordingly adjusted to drop the pressure of the gas leaving the blower while maintaining the 8 cfm flow rate by diverting the gas resulting from the pressure drop.

It can thus be seen that a simple and inexpensive means is provided for selecting the gas flow rate and the gas pressure at the outlet of a blower in a gas drying system and at the outlet of the drying apparatus itself. The need for a relatively expensive speed reduction system or other variable speed drive for the blower is eliminated. Moreover, the ease of adjustment and the wide variation of adjustment that may be obtained permits flow and pressure settings which are best suited to the various types of equipment used in the drying apparatus. For example, the filter 12 illustrated in FIG. 1 should carry no more than the amount of gas required for the system utilizing the dried gas since any excess gas will result in earlier clogging of the filter.

While only a single specific embodiment of the invention has been shown herein, it will be realized that many modifications thereof are feasible without departing from the spirit and scope of the invention. It is accordingly intended that the scope of the invention is not to be limited to the specific embodiment disclosed.

I claim:

1. In gas drying apparatus having dual adsorbent chambers and means connected to said chambers for flowing gas through the chambers, the combination including:
    blower means for flowing gas through said chambers and having a gas intake opening and a gas outlet opening;
    by-pass means mounted on said blower means and having a port connecting the intake and outlet opening of the blower means for permitting recirculation through the blower of a portion of the gas leaving the outlet opening of the blower; and
    an adjustable restricting means in said by-pass means for fixing the cross-sectional area of said port to select the desired volume of gas recirculated through said blower.

2. The combination according to claim 1 wherein said blower has a fixed operating speed and said adjustable restricting means has a normal blocking position determined by the rate of gas flow and pressure desired at the outlet opening of the blower and the minimum new gas required in addition to the recirculated gas to satisfy the desired rate of gas flow and pressure at said outlet opening for said fixed operating speed of said blower.

3. In an apparatus for drying gas flowing therethrough and including first and second adsorbent chambers each having alternating drying and reactivating periods, gas inlet means for carrying gas to either one of said chambers, valve means for controlling the alternating of the drying and reactivating periods of the first and second adsorbent chambers, a gas filter connected in said gas inlet means adjacent said gas intake end, the combination comprising:
    a blower connected between said gas filter and said adsorbent chambers, said blower having an intake connected to said filter and an outlet connected to said chambers, said blower being operative to increase the rate of flow and the pressure of said gas at its outlet relative to the rate of flow and pressure of the gas at the inlet; and
    a by-pass valve mounted on the blower and having a first opening passage aligned with the intake of said blower, a second opening passage aligned with the outlet of said blower, a by-pass port connecting said first and second opening passages, and means for restricting the cross-sectional area of the by-pass port, said by-pass valve being effective to allow recirculation of gas at the outlet of the blower back to the inlet of the blower and through the blower.

4. The combination according to claim 3 wherein said means for restricting the cross-sectional area of the by-pass port comprises a threaded member movable into and out of said port in a radial direction relative to the axis of the port.

* * * * *